(12) United States Patent
Craighead et al.

(10) Patent No.: US 8,731,359 B2
(45) Date of Patent: May 20, 2014

(54) EXTRAORDINARY LIGHT TRANSMISSION APPARATUS AND METHOD

(75) Inventors: Harold G. Craighead, Ithaca, NY (US); Watt W. Webb, Ithaca, NY (US); Huizhong Xu, Fresh Meadows, NY (US); Pangshun Zhu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 624 days.

(21) Appl. No.: 12/980,491

(22) Filed: Dec. 29, 2010

(65) Prior Publication Data

US 2011/0158575 A1   Jun. 30, 2011

Related U.S. Application Data

(60) Provisional application No. 61/291,201, filed on Dec. 30, 2009.

(51) Int. Cl.
*G02B 6/02* (2006.01)

(52) U.S. Cl.
USPC ......................................................... 385/129

(58) Field of Classification Search
CPC ......................................................... G02B 6/02
USPC ......................................................... 385/129
See application file for complete search history.

(56) References Cited

U.S. PATENT DOCUMENTS

| | | | |
|---|---|---|---|
| 5,973,316 A | 10/1999 | Ebbesen et al. | |
| 6,236,033 B1 | 5/2001 | Ebbesen et al. | |
| 6,285,020 B1 | 9/2001 | Kim et al. | |
| 6,560,006 B2 * | 5/2003 | Sigalas et al. | 359/321 |
| 6,649,901 B2 | 11/2003 | Thio et al. | |
| 7,351,374 B2 | 4/2008 | Stark | |
| 7,359,598 B2 | 4/2008 | Kim et al. | |
| 7,583,882 B2 * | 9/2009 | Guo | 385/131 |
| 7,649,677 B2 | 1/2010 | Jin et al. | |
| 7,925,122 B2 * | 4/2011 | Diest et al. | 385/1 |
| 8,346,039 B2 * | 1/2013 | Lu et al. | 385/50 |
| 2002/0056816 A1 | 5/2002 | Stark | |
| 2005/0031278 A1 | 2/2005 | Shi et al. | |
| 2008/0112713 A1 * | 5/2008 | Guo | 398/214 |

OTHER PUBLICATIONS

T. Matsui et al, Transmission Resonances Through Aperiodic Arrays of Subwavelength Apertures, Nature 446, 517-521 (Mar. 29, 2007), doi: 10.1038/nature05620.
J. Ko et al, Resonant Transmission of a Class Sub-Wavelength Apertures in Thin Conducting Screen.
F. Bilotti et al, Enhanced Transmission Through a Sub-Wavelength Aperture: Resonant Approaches Employing Metamaterials, J. Opt. A: Pure Appl. Opt. 11 (2009) 114029 (8pp).

* cited by examiner

*Primary Examiner* — Tina Wong
(74) *Attorney, Agent, or Firm* — William Greener; Alek P. Szecsy; Bond, Schoeneck & King, PLLC (57) ABSTRACT

An optical apparatus that provides extraordinary light transmission through a sub-wavelength-sized light transmitting region of the apparatus includes a core region of dielectric material having a complex dielectric constant, $\in_1$, surrounded by a metallic cladding material having a complex dielectric constant, $\in_2$, wherein the core region has a maximum dimension, 2a, further wherein 2a is less than $\lambda$, where $\lambda$ is the free-space wavelength of light incident on an input side of the apparatus, and further wherein $|\in_1|$ is greater than $0.5|\in_2|$, $\in_1$ has a positive real part, and $\in_2$ has a negative real part, whereby the incident light will be transmitted by and exit the apparatus from an output side with extraordinary transmission.

22 Claims, 5 Drawing Sheets

EXTRAORDINARY LIGHT TRANSMISSION APPARATUS AND METHOD

CROSS-REFERENCE TO RELATED APPLICATIONS

This application claims priority to U.S. provisional Patent Application Ser. No. 61/291,201 filed on Dec. 30, 2009, the content of which is incorporated herein by reference in its entirety.

FEDERALLY SPONSORED RESEARCH

This invention was made with Government support under grant ECS 9876771 awarded by NSF and grant 5 P41 EB001976-20 awarded by NIH. The United States Government has certain rights in the invention.

BACKGROUND OF THE INVENTION

1. Field of the Invention

Embodiments of the present invention relate generally to the field of optics; more particularly to optical apparatus, methods and applications that provide and utilize the phenomena of extraordinary transmission of light through a sub-wavelength-sized aperture and, most particularly to the extraordinary transmission of light through a dielectric-filled aperture(s) in a real metal film.

2. Technical Background

Ebbesen et al. reported the discovery of extraordinary transmission through sub-wavelength aperture arrays (T. W. Ebbesen, H. J. Lezec, H. F. Ghaemi, T. Thio, P. A. Wolff, Nature 391 (1998) 667). Leven et al. developed zero-mode waveguides of diameters ~1/10 of the illumination wavelength in order to measure single molecule chemical reactions in a nanoscopically restrained optical volume (M. J. Levene, J. Korlach, S. W. Turner, M. Foquet, H. G. Craighead, W. W. Webb, Science 299 (2003) 682). The proper operation of these nano-optical devices in recent single molecule spectroscopy experiments is crucially dependent on the confinement of light at the entrance of waveguide. The study of transmission through sub-wavelength apertures is particularly interesting for its potential applications in near-field scanning optical microscopy, high-resolution optical lithography and high-density optical data storage. In addition to aperture arrays, it has also been demonstrated that transmission through an isolated aperture is enhanced if the aperture is surrounded by certain periodic structures at its entrance surface (T. Thio, K. M. Pellerin, R. A. Linke, H. J. Lezec, T. W. Ebbesen, Opt. Lett. 26 (2001) 1972), and beaming of the transmitted light can occur if the exit surface is also textured (H. J. Lezec, A. Degiron, E. Devaux, R. A. Linke, L. Martin-Moreno, F. J. Garcia-Vidal, T. W. Ebbesen, Science 297 (2002) 820).

Transmission through a single cylindrical aperture and apertures of other shapes (e.g, C-shaped; H-shaped, others) has been investigated extensively in recent years in order to gain understanding of the mechanisms behind enhanced transmission and make use of this phenomenon in applications such as near-field scanning optical microscopy. While enhanced transmission can be achieved in some of the reported scanning probe designs with novel aperture shapes, the large overall probe sizes used in these designs make them undesirable, particularly for imaging delicate samples.

It has also been reported that transmission can be enhanced if a hole is filled with a dielectric material due to the increase of the cutoff wavelength. However, for wavelengths above the cutoff, transmission is still very low because no propagating modes are allowed inside the aperture.

The inventors have recognized the many benefits and advantages realizable by an optical apparatus that can provide enhanced (extraordinary) transmission through a sub-wavelength aperture, which overcomes the shortcomings known in the art for such apparatus and applications.

SUMMARY

An embodiment of the invention is an optical apparatus that provides enhanced (extraordinary) light transmission through a sub-wavelength-sized light transmitting region of the apparatus herein referred to as the 'core region' of the apparatus. Most generally, the optical apparatus includes a core region of dielectric material having a complex dielectric constant, $\in_1$, surrounded by a metallic cladding material having a complex dielectric constant, $\in_2$, wherein the core region has a maximum dimension, 2a, further wherein 2a is less than $\lambda$, where $\lambda$ is the free-space wavelength of light incident on an input side of the apparatus, and further wherein $|\in_1|$ is greater than $0.5|\in_2|$, $\in_1$ has a positive real part, and $\in_2$ has a negative real part, whereby the incident light will be transmitted by and exit the apparatus from an output side with extraordinary transmission. According to a non-limiting, exemplary aspect, the optical apparatus may be in the form of a nanoscopic near-field scanning waveguide probe that includes a commercially available tapered fiber and, an inventive probe end coupled to the tapered fiber, wherein the probe end comprises a core region as described above and wherein the cladding material has a wall thickness, $t_w$, where $(2a+2t_w)$ is less than 100 nanometers (nm). According to another non-limiting, exemplary aspect, the optical apparatus may be in the form of a (thin) sheet of the cladding material having a thickness, d, including a core region of maximum dimension 2a, wherein 2a<d and, more particularly, 2a≤0.5d. In a non-limiting exemplary aspect, the sheet thickness d has a value such that the apparatus provides a Fabry-Pérot resonance wherein the transmitted light undergoes a round trip phase shift, $\phi_{F-P}$, where $\phi_{F-P}$ is an integer multiple of $2\pi$. Transmission through a sub-wavelength aperture of finite depth can be enhanced when the depth of the aperture is such that Fabry-Pérot-like resonances are excited. For example, for 810 nm light incident on a silicon-filled 50-nm-diameter aperture in a 200-nm-thick gold film, we observed a normalized near-field intensity ratio of 1.6 at the exit. Non-limiting exemplary applications of this resonantly enhanced transmission phenomenon include near-field scanning optical microscopy and single-molecule spectroscopy. In various non-limiting aspects, the sheet may be flat, and the sheet may include a plurality of discrete core regions arranged, for example, in an array. In various non-limiting aspects, the core region may have a cross sectional geometrical shape of a circle, an oval, a slit, a plurality of connected slits, a C, a C including a protrusion, an H, an E, a square or rectangle, and others. In various non-limiting aspects, the cladding regions of the sheet may be textured or otherwise have a desired topography as reported in the art. In a non-limiting aspect, the sheet form of the optical apparatus may further include a first medium having a dielectric constant, $\in_3$, disposed immediately adjacent the input side of the apparatus and a second medium having a dielectric constant, $\in_4$, disposed immediately adjacent the output side of the apparatus. One or both of the first and second media may be solid or fluidic (including gaseous).

Exemplary optical apparatus, methods, and applications of the embodied invention will be described in detail below for enhanced transmission of light at $\lambda$=488 nm and $\lambda$=810 nm;

however, the embodied invention is believed to be operable over the visible and near infra-red spectra.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 1(a, b) schematically illustrate an optical apparatus in perspective and cross sectional views, respectively, according to illustrative aspects of the invention;

DETAILED DESCRIPTION OF EMBODIMENTS OF THE INVENTION

Reference will now be made in detail to the present exemplary embodiments of the invention, non-limiting examples of which are illustrated in the accompanying drawings. Wherever possible, the same reference numbers will be used throughout the drawings to refer to the same or like parts.

The metallic cladding material component of the invention disclosed herein is intended to be a "real metal," which means a metal material having a complex dielectric constant whose real part is a finite negative number, in contrast to "a perfectly conducting metal" where the metal's conductivity is assumed (e.g., by physicists) for simplicity to be infinite. For example, at wavelength 810 nm, gold has a dielectric constant of −24.89+1.57i. Thus the conductivity of a 'real metal' is always finite; i.e., no metal is a perfect conductor. As a result of finite conductivity, electric fields can penetrate into metals and exist in a thin layer beneath the metal surface.

As used herein and as understood in the art, the term "extraordinary transmission" means the greater-than-expected transmission of light through a sub-wavelength-sized aperture in a metal compared to the transmission expected from analysis by standard aperture theory.

Based upon both analytical and numerical methods to study transmission of light through dielectric-filled sub-wavelength apertures in a real metal, a propagating mode can in principle exist inside a waveguide of arbitrary small size if a particular relationship between the dielectric constants of the cladding and filling materials at the incident light frequency is satisfied.

Modes in a Cylindrical Waveguide

The general theories of electromagnetic wave propagating inside a cylindrical waveguide have been well documented (see, e.g., J. A. Kong, Electromagnetic Wave Theory, Wiley, New York, 1986). For electromagnetic waves with a free space wavelength $\lambda$ propagating inside a waveguide of radius a with a cladding of finite conductivity, the allowed modes are so-called hybrid modes (HE and EH), which are a linear combination of the well-known TE and TM modes. In the cylindrical coordinate system ($\rho$, $\theta$, z), the two modes are given by $$H_z = \begin{cases} AJ_m(k_1\rho)\sin m\theta\exp(ik_z z), & \rho < a \\ BH_m^{(1)}(ik_2\rho)\sin m\theta\exp(ik_z z), & \rho \geq a \end{cases}, TE \text{ mode}, \quad (1a)$$

$$E_z = \begin{cases} CJ_m(k_1\rho)\cos m\theta\exp(ik_z z), & \rho < a \\ DH_m^{(1)}(ik_2\rho)\cos m\theta\exp(ik_z z), & \rho \geq a \end{cases}, TM \text{ mode}, \quad (1b)$$

where A, B, C, D are unknown coefficients to be determined; m=0, 1, 2, . . . is the azimuth order of a mode; $J_m$ and $H_m^{(1)}$ are the mth-order Bessel function and first-kind Hankel function respectively; $k_z$ is the z-direction propagating constant; $k_1$ and $k_2$ are given by the following expressions:

$$k_1 = k_0\sqrt{\epsilon_1\mu_1 - k_z^2/k_0^2}, \quad (2a)$$

$$k_2 = k_0\sqrt{k_z^2/k_0^2 - \epsilon_2\mu_2}, \quad (2b)$$

where $\epsilon_1$, $\epsilon_2$, $\mu_1$ and $\mu_2$ are the complex relative permittivity and permeability of the core and the cladding at the given wavelength respectively, and $k_0 = 2\pi/\lambda$ is the free space wavevector. The z-direction propagating constant $k_z$ and the unknown coefficients can be determined by matching the boundary condition at $\rho = a$ leading to the following equation:

$$\frac{m^2 k_z^2}{k_0^2 a^2}\left(\frac{1}{k_1^2} + \frac{1}{k_2^2}\right)^2 = \left[\frac{\mu_1}{k_1}\frac{J_m'(k_1 a)}{J_m(k_1 a)} - \frac{\mu_2}{ik_2}\frac{H_m^{(1)'}(ik_2 a)}{H_m^{(1)}(ik_2 a)}\right]. \quad (3)$$

$$\left[\frac{\epsilon_1}{k_1}\frac{J_m'(k_1 a)}{J_m(k_1 a)} - \frac{\epsilon_2}{ik_2}\frac{H_m^{(1)'}(ik_2 a)}{H_m^{(1)}(ik_2 a)}\right].$$

Here, we assume that the relative permeability of the core and the cladding is unity: $\mu_1 = \mu_2 = 1$. We also focus on the first-order modes (m=1), to which incident plane waves can be efficiently coupled. It is convenient to introduce the effective refractive index for a mode, defined as $n_{eff}=k_z/k_0$; therefore, the original problem of finding modes becomes solving Eq. (3) for $n_{eff}$.

Numerical solutions to Eq. (3) have been obtained by assuming a Drude model for the dielectric constant of the metal to construct dispersion relations for the various modes in the waveguide. In regard to the instant invention, the behavior of modes for a fixed incident wavelength in the limit of, small aperture size, which is relevant for the design of a nanoscopic probe, is pertinent. Analytical solutions to Eq. (3) do not generally exist; however, an approximate solution can be derived in the limit of $k_0 a \ll 1$, i.e. small radius-to-wavelength ratio $a/\lambda$. In this limit, to the second order in $k_0 a$, we obtain the following equation using Taylor expansions for $J_m(k_1 a)$ and $H_m^{(1)}(ik_2 a)$ at small $k_1 a$ and $k_2 a$:

$$C_0(k_0 a)^2(\varepsilon_1+3\varepsilon_2)n_{eff}^2 - C_0(k_0 a)^2\varepsilon_2(3\varepsilon_1+\varepsilon_2) - 2(\varepsilon_1+\varepsilon_2)=0, \quad (4)$$

where $C_0 = \ln[\gamma k_0 a/2(n_{eff}^2 - \varepsilon_2)^{1/2}]$, and $\gamma$ is a constant satisfying $\ln \gamma = 0.5772$. It is still difficult to solve Eq. (4) analytically; however, we can approximate $C_0$ as a constant due to its weak logarithmic dependence on $n_{eff}$. We then obtain:

$$n_{eff}^2 = \frac{\varepsilon_2(3\varepsilon_1+\varepsilon_2)}{\varepsilon_1+3\varepsilon_2} + \frac{2(\varepsilon_1+\varepsilon_2)}{C_0 k_0^2 a^2(\varepsilon_1+3\varepsilon_2)}. \quad (5)$$

Since the second term is inversely proportional to $k_0^2 a^2$, one might expect $n_{eff}^2$ diverge as $k_0 a$ approaches to zero. However, in obtaining Eq. (4), we have assumed small $k_1 a$ and $k_2 a$, which in turn requires $n_{eff}^2$ to be finite. Thus the second term must be small in order for Eq. (5) to be a valid solution. This requirement can only be satisfied by the following condition:

$$\varepsilon_1 + \varepsilon_2 \approx 0. \quad (6)$$

Therefore, in order for an extremely small waveguide to support a mode, the dielectric constants of the core and the cladding should substantially match such that they have opposite signs and absolute values that are very close together, where 'very close,' as used herein, means $|\varepsilon_1|$ is greater than $0.5|\varepsilon_2|$. This condition can be satisfied by a dielectric-filled (real) metal waveguide, where the real parts of the complex dielectric constants of the filling and cladding materials can be chosen to substantially cancel each other. (We note that in the ideal case $|\varepsilon_1|=|\varepsilon_2|$, the sub-wavelength size of the aperture can become extremely small; e.g., $\ll \lambda/20$. While this condition may be difficult to achieve in practice due to material limitations, the instant invention does not preclude the engineering of metamaterials to more closely meet or achieve this equality). Under the above condition, $k_1$ simplifies to $$k_1 = k_0\sqrt{-\varepsilon_1 - \varepsilon_2} \approx 0. \quad (7)$$

The small $k_1$ implies that the fields of this mode have a weak dependence on the radial coordinate, which suggests that this mode may be of plasmonic nature. Eq. (6) is the exact condition required to resonantly excite a surface plasmon polariton at the corresponding planar metal-core interface in the electrostatic limit. We note that the electrostatic limit holds here as we have assumed $k_0 a \ll 1$ in our derivations. Our result is consistent with previous studies that found cylindrical holes in a plasmonic material can always support propagating modes near the surface plasmon frequency regardless of how small the holes are. Since the dielectric constants of both the metal cladding and the dielectric core can be wavelength-dependent, the above condition that the dielectric constants at the incident frequency be matched to support propagating modes inside waveguides of very small size is of practical use. We also note that for sufficiently small holes one needs to take into account the nonlocal nature of the complex dielectric constant. For the hole sizes operable in accordance with the embodied invention, we expect such effects to be negligibly small.

Transmission Through Apertures of Finite Depth

Figure 1:
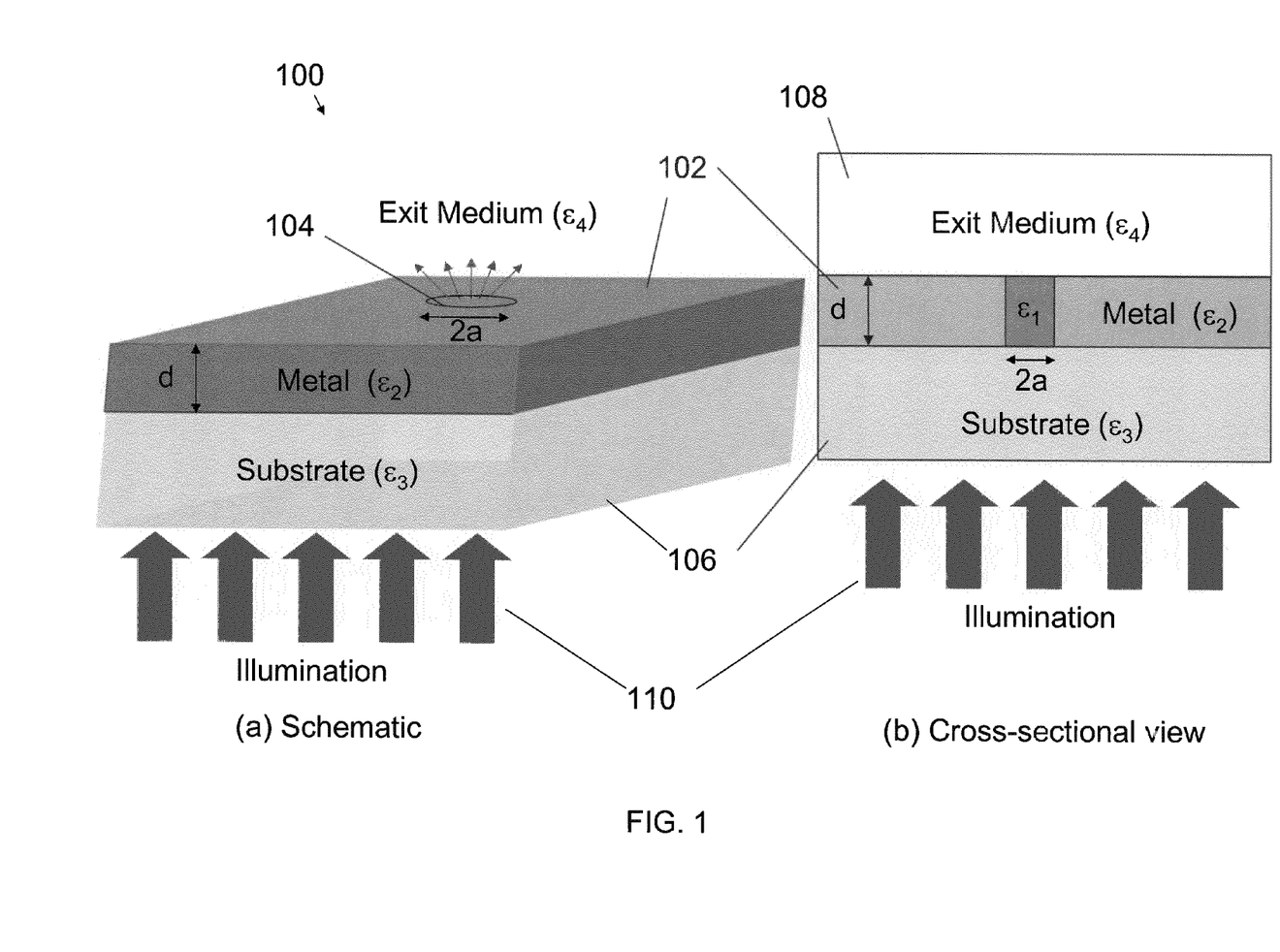

An illustrative aspect of the invention is the optical apparatus 100 as schematically shown in FIG. 1(a, b). The optical apparatus includes a metallic cladding in the form of a metal film 102 of thickness d surrounding a dielectric-filled cylindrical aperture 104 of diameter 2a. The dielectric constants of the filling 104 and the metal 102 are denoted by $\varepsilon_1$ and $\varepsilon_2$. In the instant illustrated aspect, the metal film 102 is optionally covered by a solid substrate medium 106 having a dielectric constant of $\varepsilon_3$ and an exit medium 108 (illustrated as, but not limited to, air) having a dielectric constant of $\varepsilon_4$. The relative permeability of all the relevant media is assumed to be unity. A linearly polarized plane wave 110 with a free space wavelength of $\lambda$ is normally incident onto the metal film 102 from the medium 106 below the metal film. Normalized transmission T, which is defined by the ratio of the transmitted photon flux to the incident photon flux on the aperture area 104, is used to quantify the transmission properties of the aperture:

$$T = \frac{\int \overline{P}_z dS}{\pi a^2 \cdot I_0}, \quad (8)$$

where $I_0$ is the intensity of the incident light and $\overline{P}_z$ denotes the component of the time averaged Poynting vector along the z-direction. The integration is performed over a circular area of $\pi a^2$ covering the aperture at its exit.

Using a simple model where only the fundamental mode in the aperture is considered, we can express the transmission through an aperture of thickness d and diameter 2a as:

$$T = \left| \frac{t_1 t_2 \exp(ik_z d)}{1 - R_1 R_2 \exp(i2 k_z d)} \right|^2, \quad (9)$$

where $t_1$ and $t_2$ are the transmission amplitude from an incident plane wave in the medium below the aperture to the fundamental mode in the aperture and that from the fundamental mode in the aperture to outgoing plane waves in the medium 108 above the aperture, respectively; $R_1$ and $R_2$ are the reflection amplitude of the fundamental mode at the top and bottom interface of the aperture, respectively. Letting $R_1 = |R_1|\exp(i\phi_1)$, $R_2 = |R_2|\exp(i\phi_2)$, and $k_z = k'_z + ik''_z$, we can rewrite Eq. (9) as $$T = \left| \frac{t_1 t_2 \exp(-k''_z d)}{1 - |R_1 R_2|\exp(-2k''_z d)\exp(i\phi)} \right|^2, \quad (10)$$

where $\phi$ is the total phase shift accumulated during a round trip given by $$\phi = \phi_1 + \phi_2 + 2k'_z d. \quad (11)$$

From Eq. (10) we would expect Fabry-Pérot resonances in transmission to appear when $\phi$ is an integer multiple of $2\pi$. In this simple one-mode model, the reflection amplitude of the fundamental mode at the aperture-dielectric interface can be found using the variational method reported in N. Marcuvitz (Ed.), Waveguide Handbook, McGraw-Hill, New York, 1951, as follows:

$$R = \frac{n_{eff} - (1 + n_{eff} Z_s)\Gamma}{n_{eff} + (1 - n_{eff} Z_s)\Gamma}, \quad (12)$$

where $Z_s = 1/\sqrt{\in_2}$ is the surface impedance of the metal in units of $\sqrt{\mu_0/\in_0}$, $\Gamma$ is an integral describing the overlap between the fundamental waveguide mode and all possible plane waves in the outside media. With the effective refractive index known, we can then compute $R_1$, $R_2$, and the total round-trip phase shift $\phi$, and predict whether Fabry-Pérot resonances can be excited or not.

Nanoscopic Waveguides for Near-Field Scanning Probe

Figure 2:
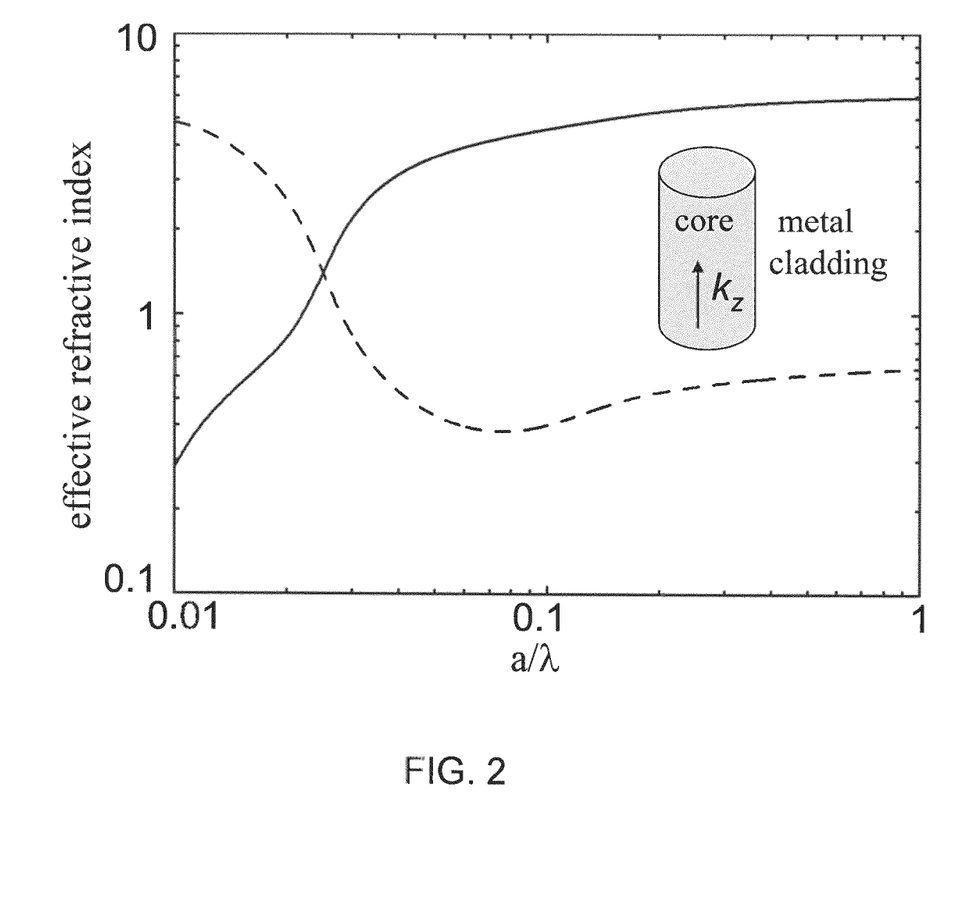
FIG. 2 is a plot showing the effective refractive index of the fundamental mode $HE_{11}$ in a cylindrical waveguide. The solid line shows the real part and the dashed line the imaginary part of the effective refractive index versus the radius-to-wavelength ratio $a/\lambda$. Dielectric constants of 15.06+0.77i and −24.89+1.57i are assumed for the core and the metal, respectively. The inset shows a schematic of a wave propagating through a dielectric-filled cylindrical waveguide.

Fabry-Pérot resonances may be readily excited in apertures of sub-wavelength size as a result of propagating modes existing inside waveguides filled with materials of matching dielectric constant as embodied herein. We expect this to support extraordinary transmission through apertures of very small ($2a \leq \lambda/20$) sizes. To demonstrate this, with reference again to FIG. 1(a, b), we used light of $\lambda$ equal to 810 nm normally incident on amorphous-silicon-filled apertures of various diameters in a 200-nm-thick gold film situated on a fused silica substrate with the medium on the exit side being air. The refractive index of gold ($\in_2 = -24.89 + 1.57i$) was interpolated from P. B. Johnson, R. W. Christy, Phys. Rev. B 6 (1972) 4370, and that of silicon ($\in_1 = 15.06 + 0.77i$) from E. D. Palik (Ed.), Handbook of Optical Constants of Solids, Academic Press, New York, 1998. First, we numerically solved Eq. (1) to obtain the effective refractive index of the fundamental mode $HE_{11}$. This mode is particularly useful, because it has the largest cutoff wavelength among all modes. FIG. 2 is a plot of the real and imaginary parts of the effective refractive index, denoted as $n'_{eff}$ and $n''_{eff}$, respectively, versus the radius-to-wavelength ratio $a/\lambda$. From this plot one observes that $n''_{eff}$ slowly decreases as $a/\lambda$ decreases from 1 but then increases from 0.4 to 5 as $a/\lambda$ crosses 0.03. Therefore, a real cutoff does not exist where $n''_{eff}$ increases abruptly while $n'_{eff}$ decreases to zero, which is a general feature of the $HE_{11}$ mode. Nevertheless, the value of $n''_{eff}$ indicates attenuation of this mode. We can thus define modes with $n''_{eff}$ below a certain threshold as semi-propagating modes. From FIG. 2 one can further see that $n''_{eff}$ is still small even at $a/\lambda$ ratio of 0.03, and we would expect the rise of $n''_{eff}$ to occur at even smaller values of $a/\lambda$ if the dielectric constants of the metal and the filling material are better matched. This result is consistent with our analytical result that propagating modes can in principle be supported at extremely small radius-to-wavelength ratios if the dielectric constants of the filling and cladding materials nearly or exactly cancel each other.

Figure 3:
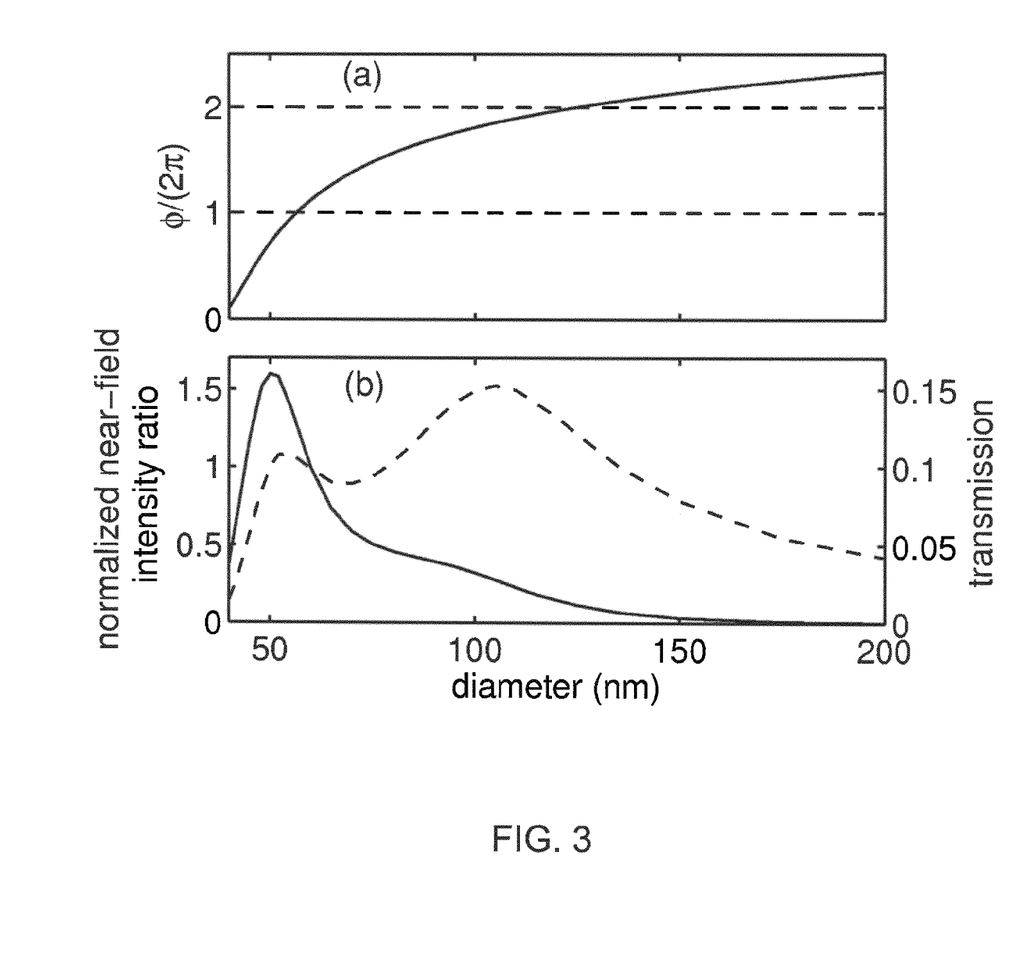
FIG. 3 illustrates transmission properties for 810 nm light incident on amorphous-silicon-filled apertures in a 200-nm-thick gold film situated on a fused silica substrate, the medium on the exit side is assumed to be air. (a) Total round-trip phase shift $\phi$ versus aperture diameter; (b) Calculated normalized near-field intensity ratio (solid line) on a plane 5 nm away from the exit surface and normalized total transmission (dashed line) versus aperture diameter, according to illustrative aspects of the invention.

With the effective refractive index of the fundamental mode known, we can now use Eq. (11) to calculate the total round-trip phase shift. The result is shown in FIG. 3(a). From FIG. 3(a), we expect two Fabry-Pérot resonances to occur, at diameters of 56 nm and 125 nm, where the total round-trip phase shift is $2\pi$ and $4\pi$, respectively. We used a three-dimensional finite element method to simulate transmission of light through the silicon-filled apertures in the 200-nm-thick gold film. Perfectly matched layer boundary conditions were assumed to terminate a computation domain of one wavelength in all three directions. Using the solution obtained from the finite element method, we calculated a normalized transmission according to Eq. (8) and a normalized near-field intensity ratio. The normalized near-field intensity ratio is defined as the average near-field intensity over the area of an aperture on a plane that is 5 nm away from the exit surface normalized by the intensity of the incident light. The results are shown in FIG. 3(b).

Figure 4:
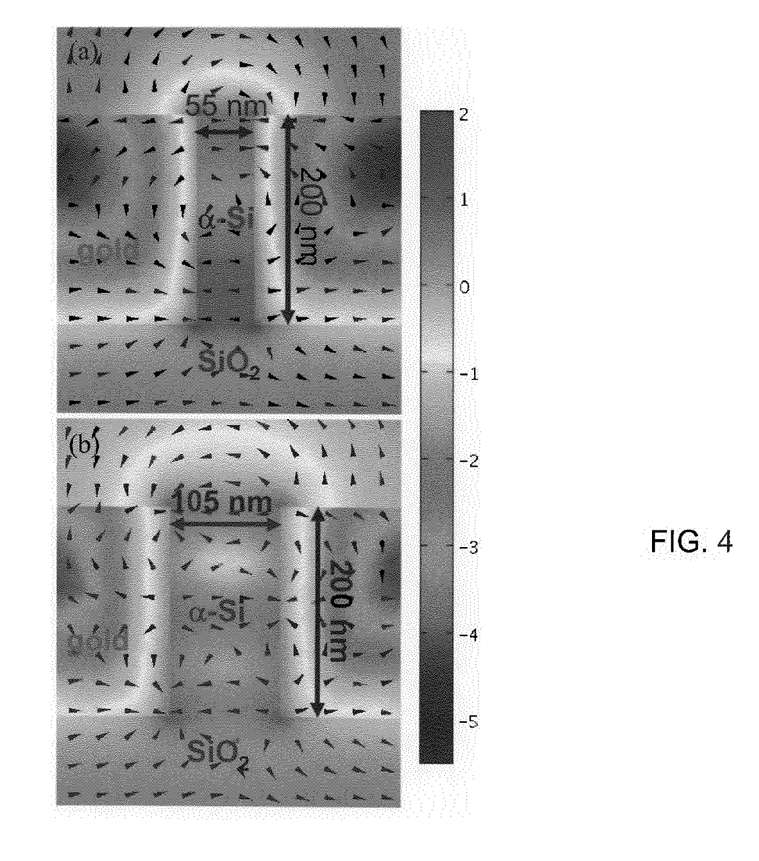
FIG. 4 schematically illustrates field distributions inside the dielectric-filled aperture for 810 nm light incident on amorphous-silicon-filled apertures in a 200-nm-thick gold film situated on a fused silica substrate, the medium on the exit side is assumed to be air. (a) Aperture diameter 55 nm. (b) Aperture diameter 105 nm. False colors denote the square of the norm of the electric field (normalized by the incident electric field) in a logarithmic scale. The black arrows denote electric field directions.

FIG. 3(b) shows two broad resonances in transmission around diameters of 55 nm and 105 nm, respectively, where total transmission reaches more than 10%. The peaks in the calculated transmission correspond reasonably well to the positions where the total round-trip phase shift is an integer multiple of $2\pi$. The discrepancy of this correspondence for the peak on the large diameter side may be a result of neglecting the high-order modes in the simple one-mode model. This suggests that these transmission peaks may be Fabry-Pérot-like resonances, which suggestion is reinforced by the electrical field distributions inside the aperture at the 55 nm and 105 nm transmission peaks, as shown in FIG. 4(a, b). It can be seen in FIG. 4 that the electric field vector changes its direction at the half-depth at the 55 nm peak (FIG. 4a), while at the 105 nm peak the electrical field changes its direction twice along the depth of the aperture (FIG. 4b). The normalized near-field intensity ratio at the 55 nm resonance is more than unity, indicating enhancement of fields at the exit as a result of the excitation of surface plasmon resonances. This large near-field intensity may be particularly advantageous in near-field scanning fluorescence microscopy where illumination is used to excite fluorescent markers.

Figure 5:
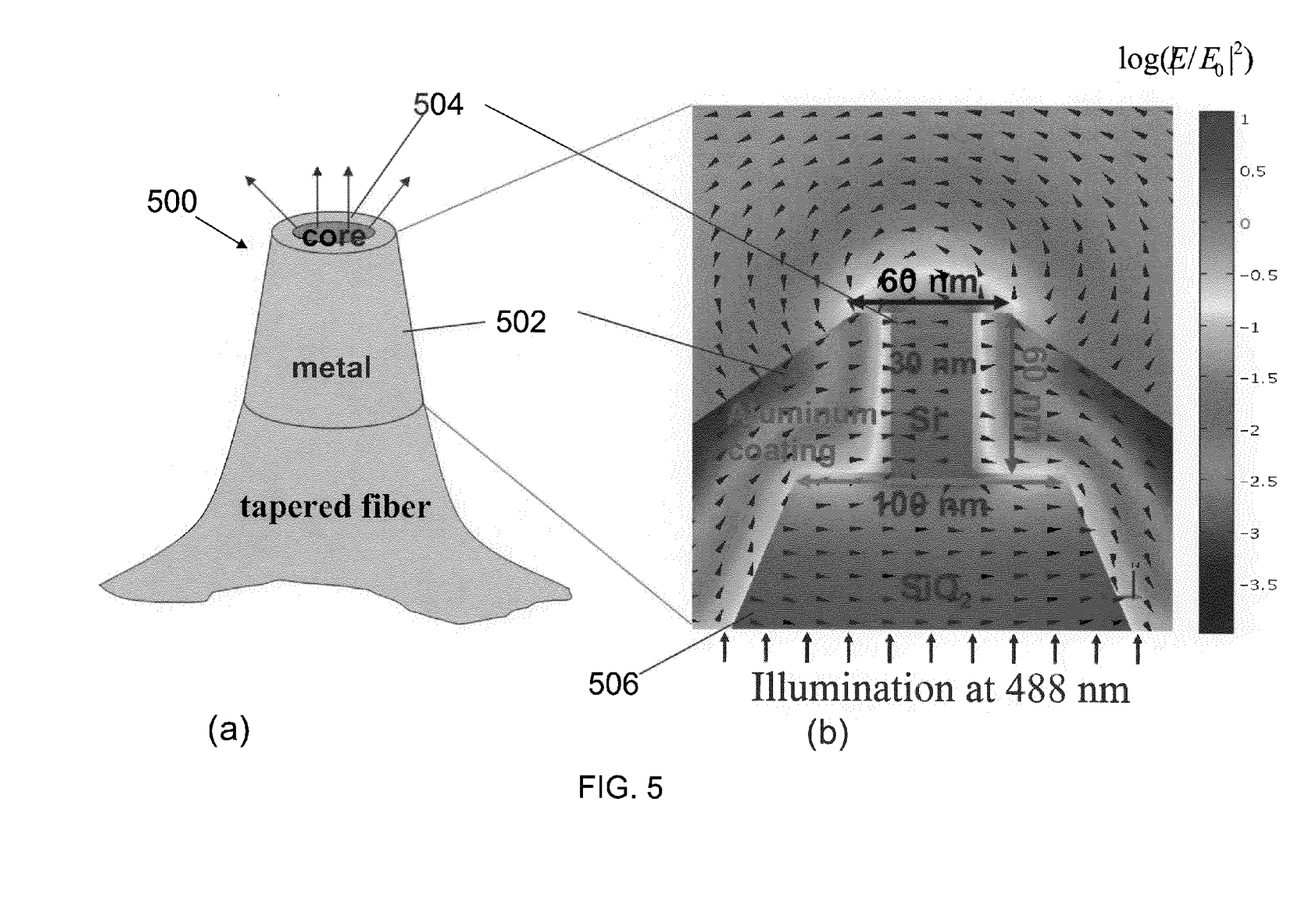
FIG. 5 schematically illustrates a nanoscopic near-field scanning probe according to an exemplary aspect of the invention. (a) Schematic of an exemplary probe design; (b) Field distributions in the probe end.

An embodiment of the invention is directed to a nanoscopic near-field probe 500 as illustrated in FIG. 5. The above phenomenon of extraordinary transmission through dielectric-filled apertures in metals may be useful for implementing such a probe apparatus with enhanced (extraordinary) transmission even at aperture diameters of $\lambda/20$. Exploiting the wavelength-dependent nature of the dielectric constants of various materials, we can find an appropriate combination of materials for the core and cladding to implement the above phenomenon at various wavelengths. FIG. 5b shows the calculated transmission intensity pattern of $\lambda = 488$ nm light through a crystalline-silicon (Si)-filled aperture 504 of 30 nm diameter, having a tapered aluminum cladding 502 situated on a fused silica ($SiO_2$) substrate 506 with the medium on the exit side being air. As shown in FIG. 5b, a strong near-field intensity is confined within a size just slightly larger than the aperture diameter in the lateral direction and extends outside the exit surface for a distance of about half the aperture size before it attenuates exponentially. We note that the near-field intensity would be three orders of magnitude smaller were the aperture filled only with air. The total end size of the illustrated probe 500 with a 30 nm aperture 504 is only 60 nanometers (i.e., 15 nm thick metal cladding wall), which is considerably smaller than currently available near-field scanning probes of around 300 nm. It will be appreciated by those skilled in the art that the thickness of the metal cladding in the instant embodied aspect should be sufficiently thick to prevent modal leakage, but need be no thicker. The small end size of the embodied probe design can be advantageous in cellular imaging applications where minimal disturbance to the sample is desired.

The exemplary aspects disclosed hereinabove featured metal cladding materials of aluminum and gold, and dielectric core fillings of crystalline silicon and amorphous silicon, for incident free space wavelengths of 488 nm and 810 nm, respectively. It is to be appreciated that other metal cladding materials, including but not limited to, e.g., silver, and dielectric core materials may be used to enable the invention as long as the claimed conditions are satisfied. While the aperture shape in the exemplary embodiments is circular (thus creating a cylindrical core medium), other sub-wavelength size aperture shapes as known in the art, including but not limited to, a slit, a C, an H, an E, a rectangle, and an oval, may be used.

In the thin sheet aspect of the invention described herein above, the metallic cladding sheet may typically be flat; however a shaped or otherwise curved sheet may be advantageous. The sheet may contain one or more dielectric-filled apertures that may be arranged in an array or other desired pattern.

All references, including publications, patent applications, and patents cited herein are hereby incorporated by reference in their entireties to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. An optical transmitting apparatus, comprising:
    a metallic cladding material having a complex dielectric constant, $\in_2$;
    a core region of dielectric material having a complex dielectric constant, $\in_1$, surrounded by the cladding material, the core region having a maximum dimension, 2a, wherein 2a is less than λ, where λ is the free-space wavelength of light incident on an input side of the apparatus, further wherein $|\in_1|$ is greater than 0.5 $|\in_2|$, $\in_1$ has a positive real part, and $\in_2$ has a negative real part, wherein the incident light will be transmitted by and exit the apparatus from an output side.

2. The apparatus of claim 1, wherein $|\in_1|$ is approximately equal to $|\in_2|$.

3. The apparatus of claim 1, wherein λ/20≤2a ≤λ/10.

4. The apparatus of claim 3, wherein the cladding material has a wall thickness, $t_w$, where (2a+2$t_w$) is less than 100 nanometers (nm).

5. The apparatus of claim 4, wherein (2a+2$t_w$) is equal to or less than about 60 nm.

6. The apparatus of claim 3, wherein:
    the metallic cladding material is in the form of a sheet having a thickness, d, further wherein 2a is less than d(2a<d); and
    the core region of dielectric material penetrates through the sheet and is surrounded by the metallic cladding material.

7. The apparatus of claim 6, wherein 2a is equal to or less than 0.5d(2a≤0.5d).

8. The apparatus of claim 6, further comprising a plurality of discrete core regions.

9. The apparatus of claim 6, wherein d has a value such that the apparatus provides a Fabry-Perot resonance wherein the transmitted light undergoes a round trip phase shift, $\phi_{F-P}$, where $\phi_{F-P}$ is an integer multiple of 2π.

10. The apparatus of claim 6, wherein the core region has a cross sectional shape in the form of a circle.

11. The apparatus of claim 6, wherein the core region has a cross sectional shape in the form of a slit.

12. The apparatus of claim 6, wherein the core region has a cross sectional shape in the form of a C.

13. The apparatus of claim 6, wherein the core region has a cross sectional shape in the form of an H.

14. The apparatus of claim 6, wherein the core region has a cross sectional shape in the form of an E.

15. The apparatus of claim 6, wherein the core region has a cross sectional shape in the form of a rectangle.

16. The apparatus of claim 6, wherein the core region has a cross sectional shape in the form of an oval.

17. The apparatus of claim 6, wherein the sheet is in the form of a flat sheet.

18. The apparatus of claim 1, wherein λ=488 nm, the cladding material is aluminum, and the core dielectric material is silicon.

19. The apparatus of claim 1, wherein λ=810 nm, the cladding material is gold, and the core dielectric material is amorphous silicon.

20. The apparatus of claim 6, further comprising a first medium having a dielectric constant, $\in_3$, disposed immediately adjacent the input side of the apparatus and a second medium having a dielectric constant, $\in_4$, disposed immediately adjacent the output side of the apparatus.

21. The apparatus of claim 20, wherein the first medium is fused silica and the second medium is air.

22. The apparatus of claim 1 wherein the incident light will be transmitted by and exit the apparatus from an output side with extraordinary transmission.

* * * * *